G. DEAL.
ELECTRIC STOVE.
APPLICATION FILED OCT. 23, 1915.

1,213,595.

Patented Jan. 23, 1917.
2 SHEETS—SHEET 1.

Witnesses

Inventor
George Deal,
By
Attorney

G. DEAL.
ELECTRIC STOVE.
APPLICATION FILED OCT. 23, 1915.

1,213,595.

Patented Jan. 23, 1917.
2 SHEETS—SHEET 2.

Witnesses

Inventor
George Deal,
By
Attorney

UNITED STATES PATENT OFFICE.

GEORGE DEAL, OF OMAHA, NEBRASKA.

ELECTRIC STOVE.

1,213,595.      Specification of Letters Patent.      Patented Jan. 23, 1917.

Application filed October 23, 1915. Serial No. 57,573.

*To all whom it may concern:*

Be it known that I, GEORGE DEAL, a citizen of the United States, residing at Omaha, in the county of Douglas and State of Nebraska, have invented certain new and useful Improvements in Electric Stoves; and I do hereby declare the following to be a full, clear, and exact description of the invention, such as will enable others skilled in the art to which it appertains to make and use the same.

The invention relates to improvements in electric stoves.

The object of the present invention is to improve the construction of electric stoves and to provide a simple, practical and comparatively inexpensive electric stove equipped with ovens and top heaters and adapted for cooking at the top as well as baking in the oven and capable of also operating as a fireless cooker after the plates of the heating units have been heated by electricity and the current cut off.

With these and other objects in view the invention consists in the construction and novel combination and arrangement of parts hereinafter fully described, illustrated in the accompanying drawings and pointed out in the claim hereto appended, it being understood that various changes in the form, proportion and minor details of construction may be resorted to without departing from the spirit or sacrificing any of the advantages of the invention.

Figure 1:
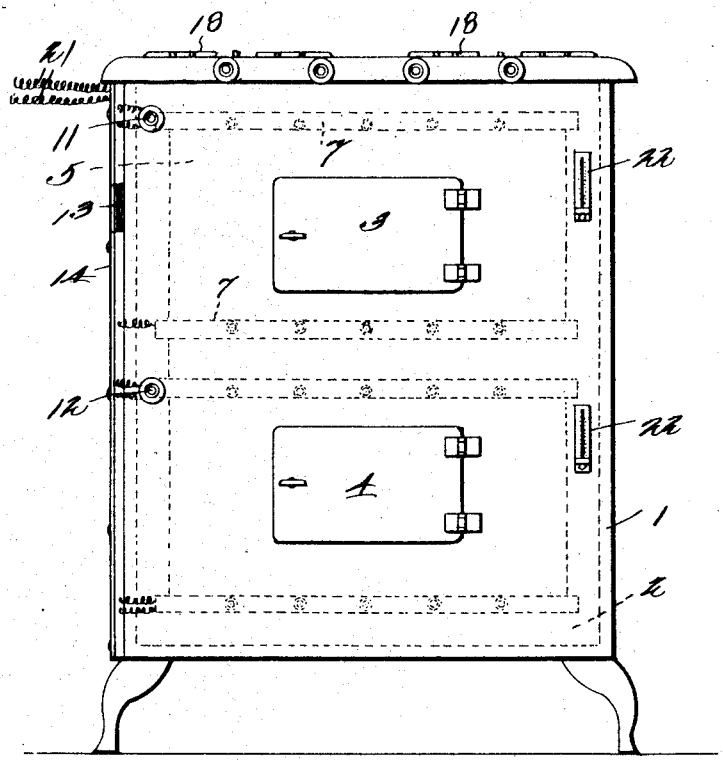
Figure 2:
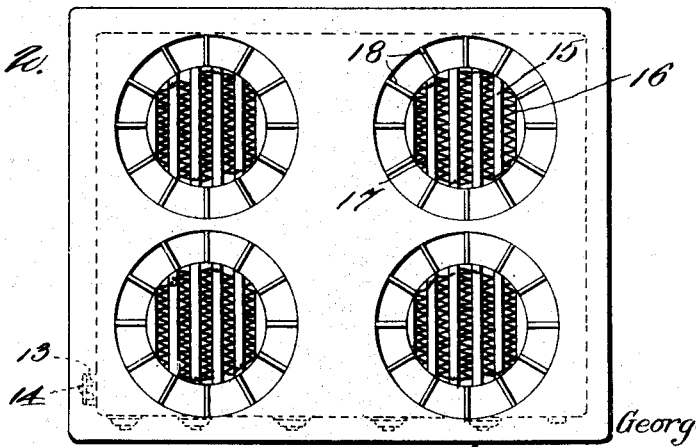
Figure 3:
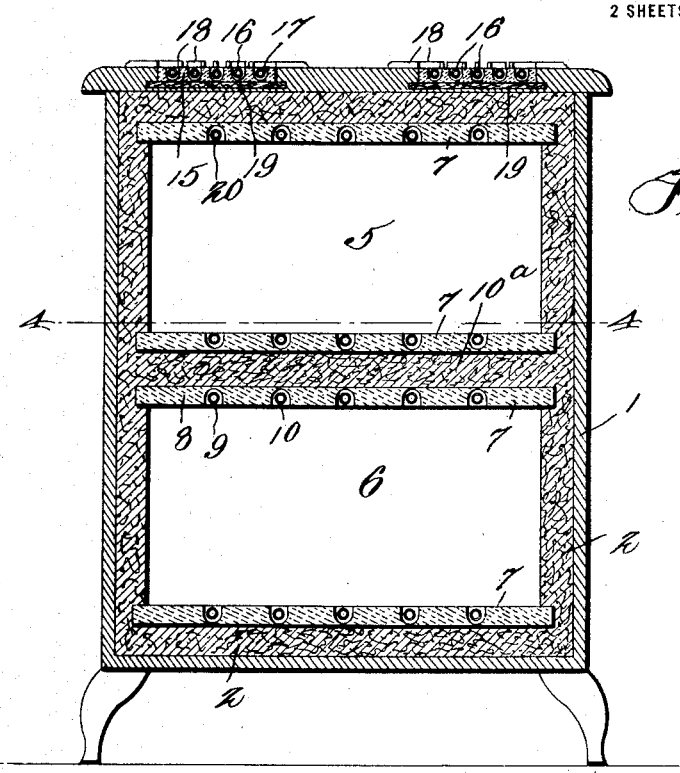
Figure 4:
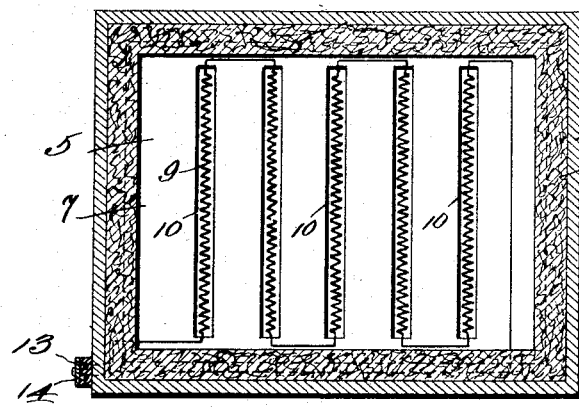

In the drawings, Figure 1 is a front elevation of an electric stove constructed in accordance with this invention, Fig. 2 is a plan view of the same, Fig. 3 is a vertical sectional view of the electric stove, Fig. 4 is a horizontal sectional view taken substantially on the line 4—4 of Fig. 3.

Like numerals of reference designate corresponding parts in the several figures of the drawings.

In the accompanying drawings in which is illustrated the preferred embodiment of the invention, the electric stove comprises in its construction, a casing 1 constructed of suitable metal and provided with an interior lining 2 of clay and asbestos or other suitable material which is a non-conductor of heat so as to confine the heat within the stove and enable the same after heating units hereinafter described, are heated by electricity and the current cut off, to operate as a fireless cooker for baking and various other cooking operations. The stove casing is provided at the front with upper and lower doors 3 and 4 communicating with and adapted to afford access to upper and lower ovens 5 and 6.

The stove is provided at the top and bottom of the upper and lower ovens with heating units 7 each consisting of a plate or body 8 of asbestos and heating coils 9 arranged in grooves 10 of the plate or body and adapted to heat the same when the circuit in which the coils are arranged is closed. The upper and lower ovens are separated by a partition $10^a$ composed of fire clay and asbestos or other suitable material so that either one or both of the ovens may be used. The heating elements of the upper and lower ovens are controlled by circuit closers 11 and 12 and the wires are designed to be arranged in grooves 13 of the stove casing and are covered by removable plates so as to afford ready access to the wires.

The stove is equipped at the top with a plurality of electric heaters each comprising a heating element consisting of a disk or plate 15 of soap stone and heating coils 16 arranged in grooves 17 of the disk or plate. Each electric heater is equipped at the top with a suitable support 18 and a sheet of asbestos 19 is arranged at the lower face of the plate or body 15. The various electric heaters of the top of the stove are controlled by circuit closers 20 arranged in a row at the top of the stove and at the front thereof and the current may be supplied to the stove by suitable leads 21 extending to any source of electric current supply.

The electric fireless cooker is designed to be constructed in various styles and sizes and it will be clear that after the soapstone plates 7 or disks 15 of the heating units have been raised to the required temperature the stove is adapted to operate as a fireless cooker. The stove is equipped at the upper and lower ovens with thermometers 22 for enabling the temperature to be ascertained and it will be clear that in heating the soapstone plates or bodies no heat is lost or wasted in transferring them from a heating apparatus to the casing in which they are to operate as a fireless cooker.

What is claimed is:—

A stove of the class described including a casing provided in its top with an opening, a lining of non-heat conducting material arranged at the inner face of the casing and extending beneath the opening, an asbestos disk supported by the lining at the bottom of the opening, and an electric heater consisting of a disk or body arranged in the opening and provided in its upper face with grooves, and heating elements arranged in the grooves, and a support projecting over the plate or body.

In testimony whereof I affix my signature in presence of two witnesses.

GEORGE DEAL.

Witnesses:
 DAVE T. SELF,
 WALTER D. CROPPER.

Copies of this patent may be obtained for five cents each, by addressing the "Commissioner of Patents, Washington, D C."